United States Patent
Tsuda et al.

(10) Patent No.: US 11,940,644 B2
(45) Date of Patent: Mar. 26, 2024

(54) DISPLAY APPARATUS

(71) Applicant: Japan Display Inc., Tokyo (JP)

(72) Inventors: Motoki Tsuda, Tokyo (JP); Kazuki Ichihara, Tokyo (JP); Michikazu Noguchi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/195,372

(22) Filed: May 10, 2023

(65) Prior Publication Data

US 2023/0367054 A1 Nov. 16, 2023

(30) Foreign Application Priority Data

May 12, 2022 (JP) .................. 2022-078509

(51) Int. Cl.
*F21V 8/00* (2006.01)
*G02F 1/13357* (2006.01)

(52) U.S. Cl.
CPC .......... *G02B 6/003* (2013.01); *G02B 6/0068* (2013.01); *G02F 1/133621* (2013.01); *G02F 2202/28* (2013.01)

(58) Field of Classification Search
CPC .... G02B 6/003; G02B 6/0068; G02B 6/0013; G02B 6/42; G02B 6/4204; G02F 1/133621; G02F 2202/28
See application file for complete search history.

(56) References Cited

U.S. PATENT DOCUMENTS

2022/0171222 A1\* 6/2022 Gou .................. G02F 1/1334
2022/0221644 A1 7/2022 Gou et al.

FOREIGN PATENT DOCUMENTS

JP 2021-056470 A 4/2021

\* cited by examiner

*Primary Examiner* — Anne M Hines
*Assistant Examiner* — Jose M Diaz
(74) *Attorney, Agent, or Firm* — XSENSUS LLP

(57) ABSTRACT

A performance of an apparatus is improved. A display apparatus includes: a light guide panel; a light source unit including a plurality of light emitting diode elements arranged in an X direction at a position facing a side surface of the light guide panel; and a plurality of lenses arranged in the X direction between the light guide panel and the light source unit and adhered to each other while sandwiching an adhesive layer allowing visible light to penetrate therethrough. Each of the plurality of lenses includes a surface facing the light source unit, a surface opposite to this surface, and a side surface (lens side surface) crossing these surfaces and being adhered to the adhesive layer. The adhesive layer is arranged between the sides surfaces facing each other.

5 Claims, 9 Drawing Sheets

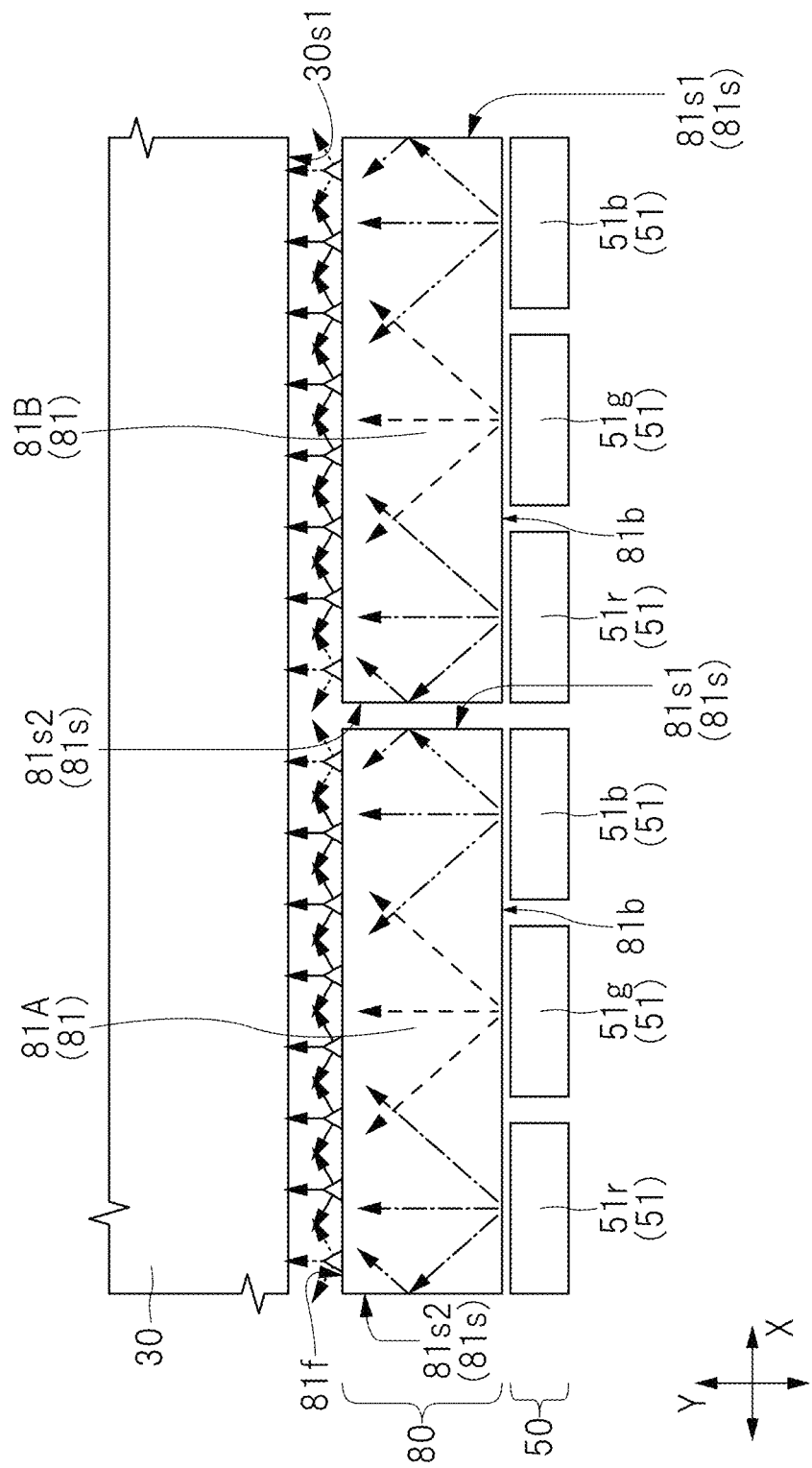

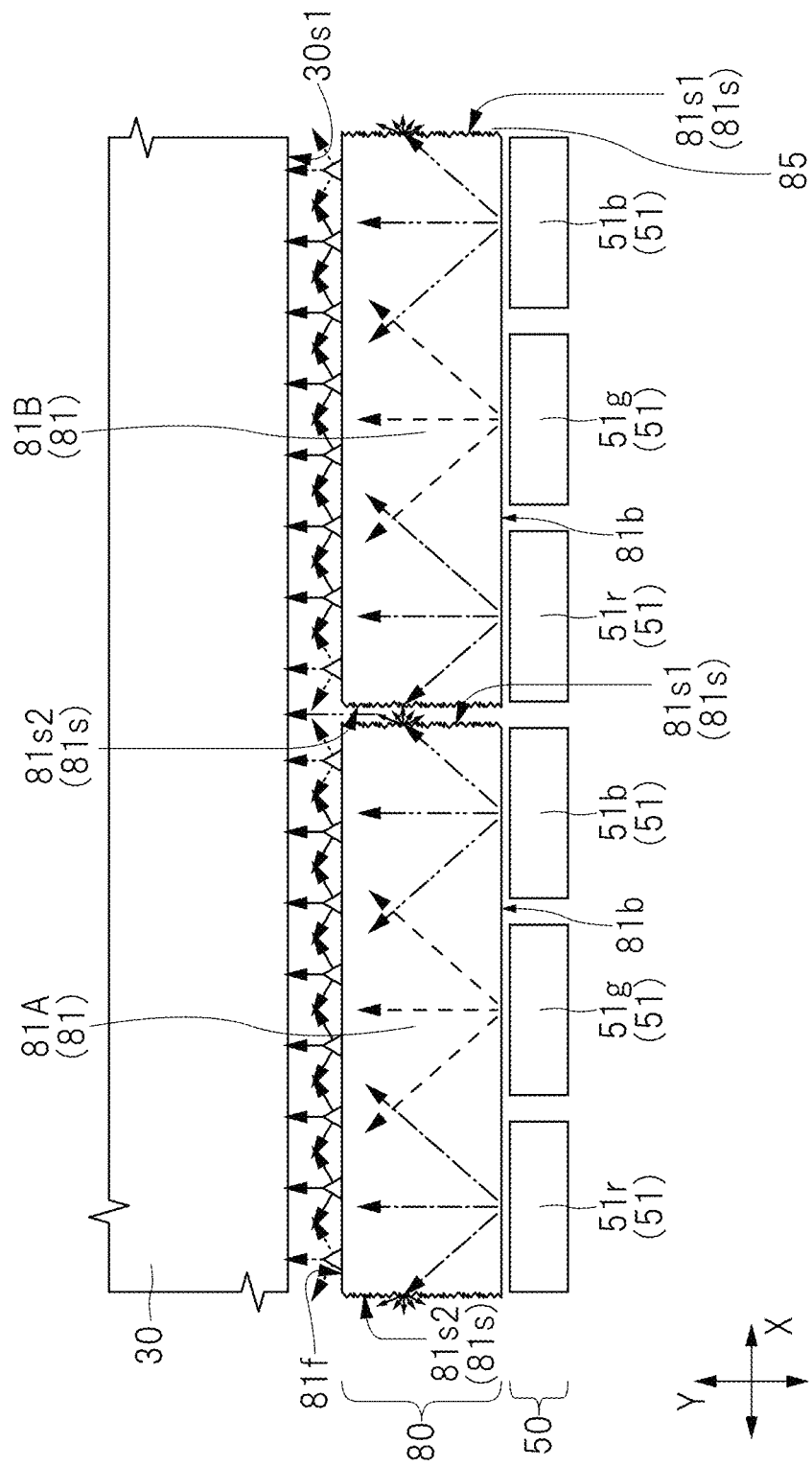

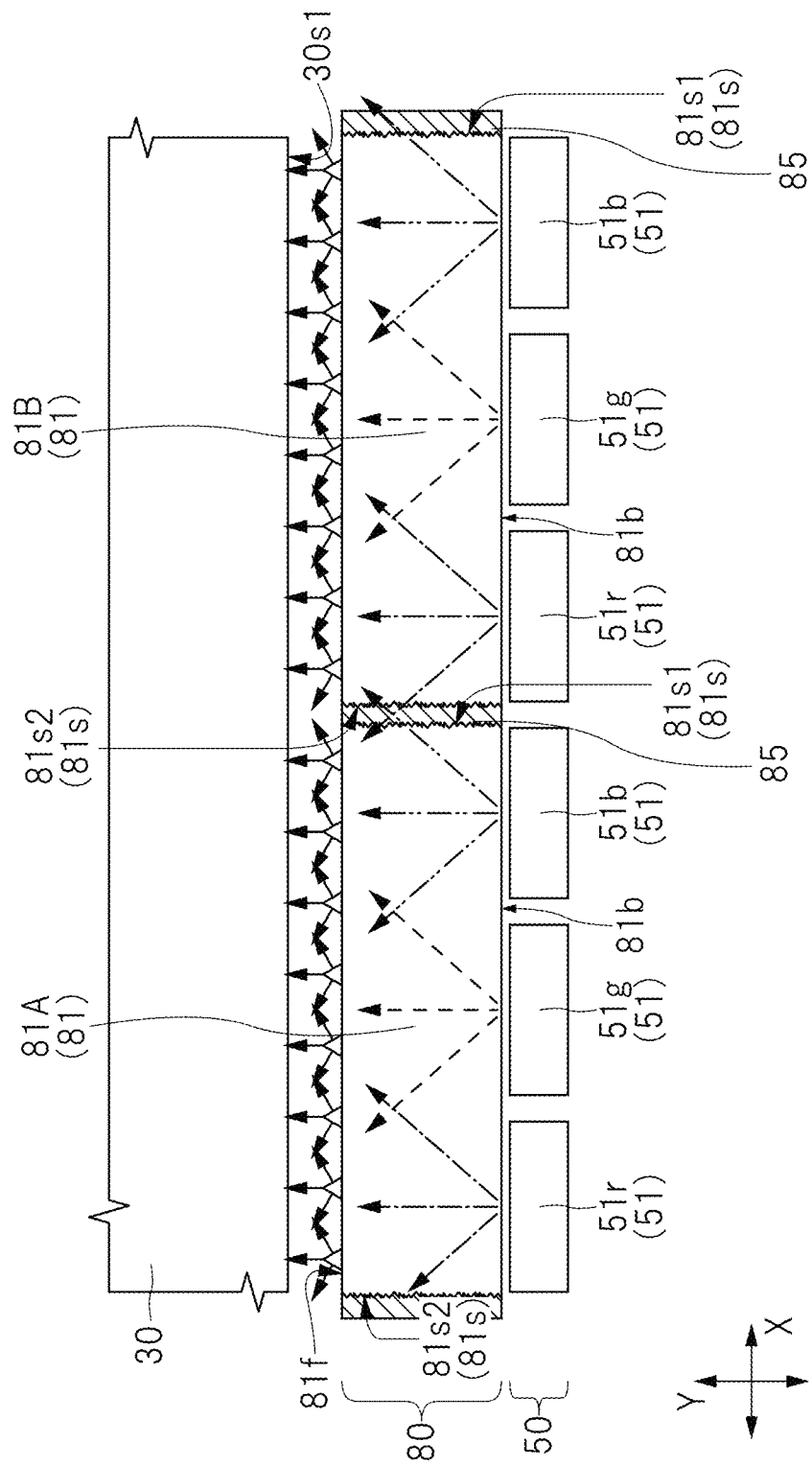

DISPLAY APPARATUS

CROSS-REFERENCE TO RELATED APPLICATION

The present application claims priority to Japanese Patent Application No. 2022-078509 filed on May 12, 2022, the disclosure of which is incorporated herein by reference.

TECHNICAL FIELD OF THE INVENTION

The present invention relates to a display apparatus using a liquid crystal layer.

BACKGROUND OF THE INVENTION

There are display apparatuses in each of which a light guide panel functioning as a lens is arranged between a plurality of light emitting diodes and the light guide panel. For example, Japanese Patent Application Laid-Open Publication No. 2021-56470 (Patent Document 1) describes a display apparatus in which a light guide panel functioning as a prism lens is divided into a plurality of light guide panels facing each other while sandwiching an air layer therebetween.

RELATED ART DOCUMENT

Patent Document

Patent Document 1: Japanese Patent Application Laid-Open Publication No. 2021-56470

SUMMARY OF THE INVENTION

The invention of the present application has developed a transparent display apparatus allowing an observer to recognize a display image and a background while overlapping the display image and the background. Such a transparent display apparatus needs to have a property of a front surface and a back surface, each of which transmits visible light. Therefore, a light source unit for displaying images is arranged on a side surface of the light guide panel. In order to widely diffuse light emitted from the light source unit, a lens is preferably arranged between the light guide panel and the light source unit. The inventors of the present application have paid attention to the fact that a plurality of lenses each having a small size are preferably arranged between the light guide panel and the light source unit in a viewpoint of lens general versatility, lens handling or lens production efficiency. However, the inventors have found out that, if there is a gap (air layer) between adjacent lenses, undesirable light behavior is observed due to influence of reflection or scattering on a side surface of the lens.

A display apparatus according to an embodiment of the present invention includes: a first substrate including a first front surface and a first back surface opposite to the first front surface; a liquid crystal layer arranged on the first front surface of the first substrate; a light guide panel including a first surface facing the first front surface, a second surface opposite to the first surface and a first side surface crossing the first surface and the second surface; a light source unit including a plurality of light emitting diodes arranged in a first direction at a position facing the first side surface of the light guide panel; and a plurality of lenses arranged in the first direction between the light guide panel and the light source unit and adhered to each other while sandwiching an adhesive layer allowing visible light to penetrate therethrough. Each of the plurality of lenses includes a third surface facing the light source unit, a fourth surface opposite to the third surface, and a lens side surface crossing the third surface and the fourth surface and adhered to the adhesive layer. The adhesive layer is arranged between the lens side surfaces facing each other.

BRIEF DESCRIPTIONS OF THE DRAWINGS

FIG. 8 is a plan view showing a study example compared to FIG. 7;

FIG. 9 is a plan view showing another study example different from FIG. 8; and

FIG. 10 is a plan view showing a modification example compared to FIG. 7.

DESCRIPTIONS OF THE PREFERRED EMBODIMENTS

Figure 1:
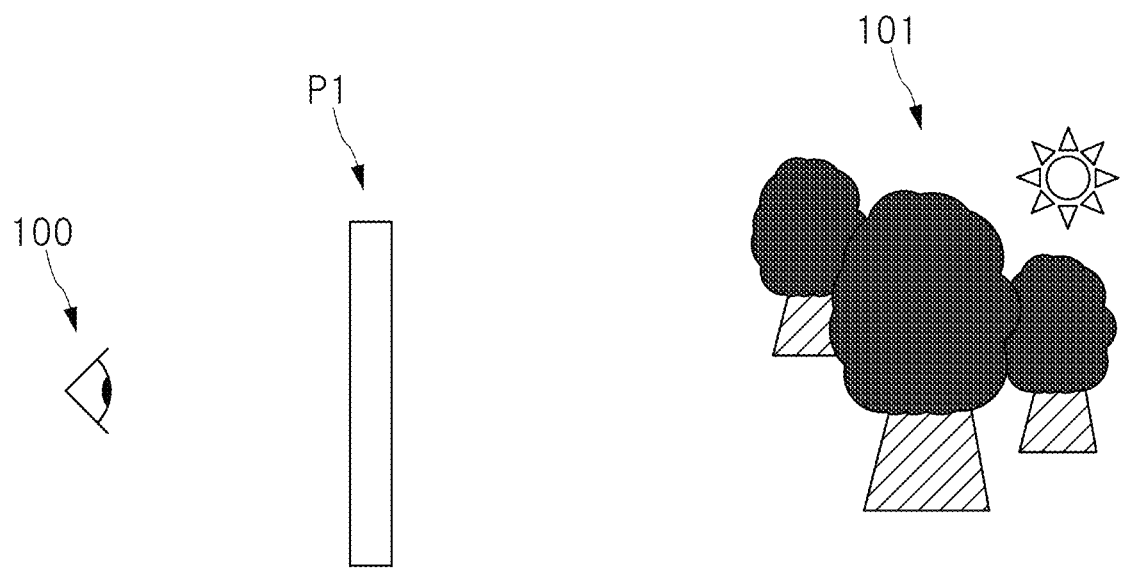
FIG. 1 is an explanatory diagram showing a positional relation in a case in which a viewer on one surface side of a transparent display panel apparatus visually recognizes a background on the other side through the transparent display panel apparatus.

The following is explanation for each embodiment of the present invention with reference to drawings. Note that disclosure shows only one example, and appropriate modification with keeping the concept of the present invention which can be easily anticipated by those skilled in the art is obviously within the scope of the present invention. Also, in order to make the clear description, a width, a thickness, a shape, and others of each portion in the drawings are schematically illustrated more than those in an actual aspect in some cases. However, the illustration is only one example, and does not limit the interpretation of the present invention. In the present specification and each drawing, similar elements to those described earlier for the already-described drawings are denoted with the same or similar reference characters, and detailed description for them is appropriately omitted in some cases.

In the following embodiments, a liquid crystal display apparatus displaying images by using visible light scattering made by liquid crystal molecules will be exemplified and explained as an example of a display panel used in combination with a glass panel.

And, the liquid crystal display apparatus is an apparatus that forms the display images by changing orientation of molecules contained in a liquid crystal layer, and needs a light source. In the embodiments explained below, the light source is arranged separately from the display panel. Therefore, the display panel and a light source module that supplies the visible light to the display panel will be explained to be distinguished from each other.

<Transparent Display Panel>

Figure 2:
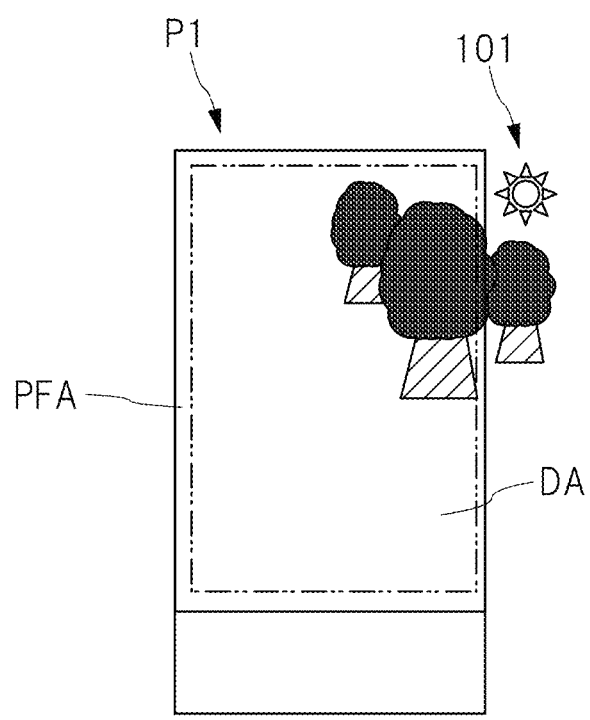
FIG. 2 is an explanatory diagram showing an example of the background visually recognized through the transparent display panel apparatus.

First, a feature of so-called transparent display panel will be explained. FIG. 1 is an explanatory diagram showing a positional relation in a case in which a viewer on one surface side of a transparent display panel visually recognizes a background on the other side through the transparent display panel. FIG. 2 is an explanatory diagram showing an example of the background visually recognized through the transparent display panel.

When an observer 100 looks at the other side from one side of a display panel P1 as shown in FIG. 1, a background 101 is visually recognized through the display panel P1. When both a display region DA and a peripheral region PFA outside the display region DA transmit the light as shown in FIG. 2, the observer can visually recognize the entire background 101 without uncomfortable feeling. On the other hand, when the peripheral region PFA has a light blocking property not transmitting the light, a part of the background 101 to be visually recognized through the display panel P1 is blocked by the peripheral region PFA, and therefore, occasionally makes the observer 100 (see FIG. 1) uncomfortable. In the case of the display panel P1 that is the transparent display panel as described above, each of the display region DA and the peripheral region PFA preferably has a property allowing visible light to penetrate therethrough. And, in a viewpoint of the visual recognition of the background 101 without the uncomfortable feeling, the display region DA and the peripheral region PFA are particularly preferable to be almost the same as each other in the property allowing the visible light to penetrate therethrough.

Figure 3:
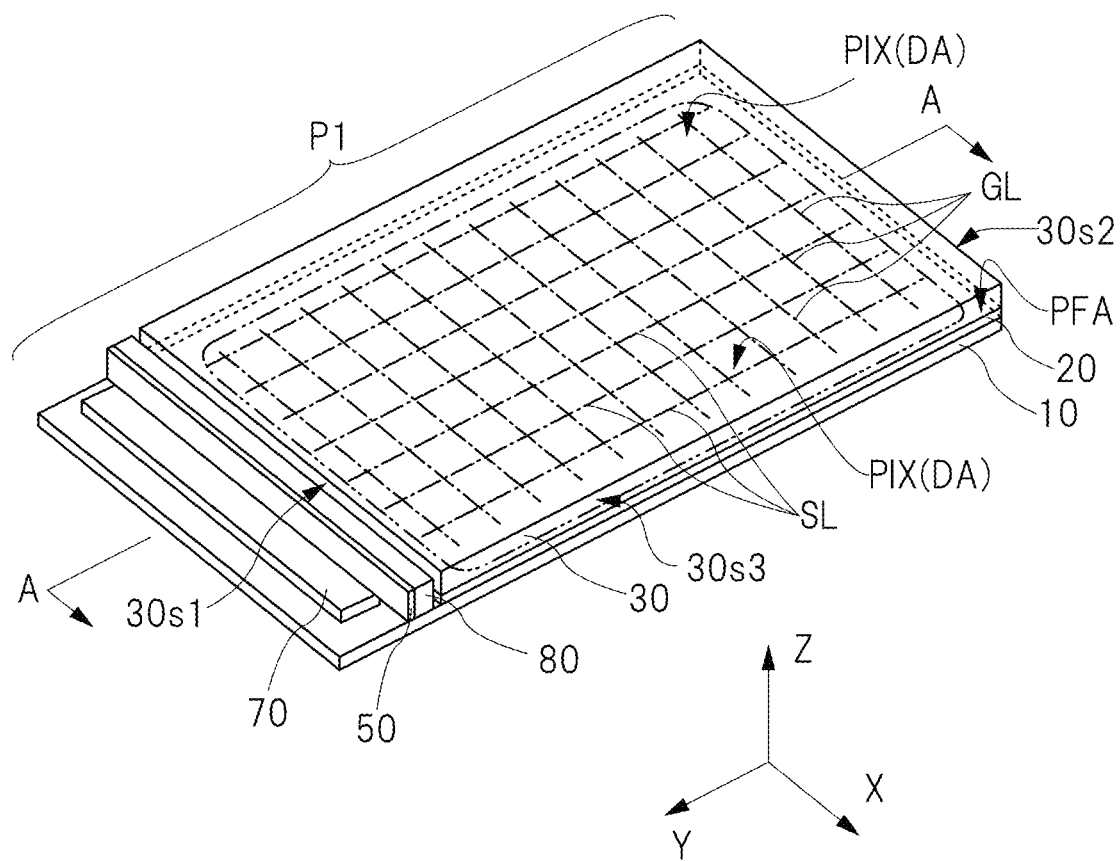
FIG. 3 is a perspective view showing an example of a transparent display panel shown in FIG. 1.
Figure 5:
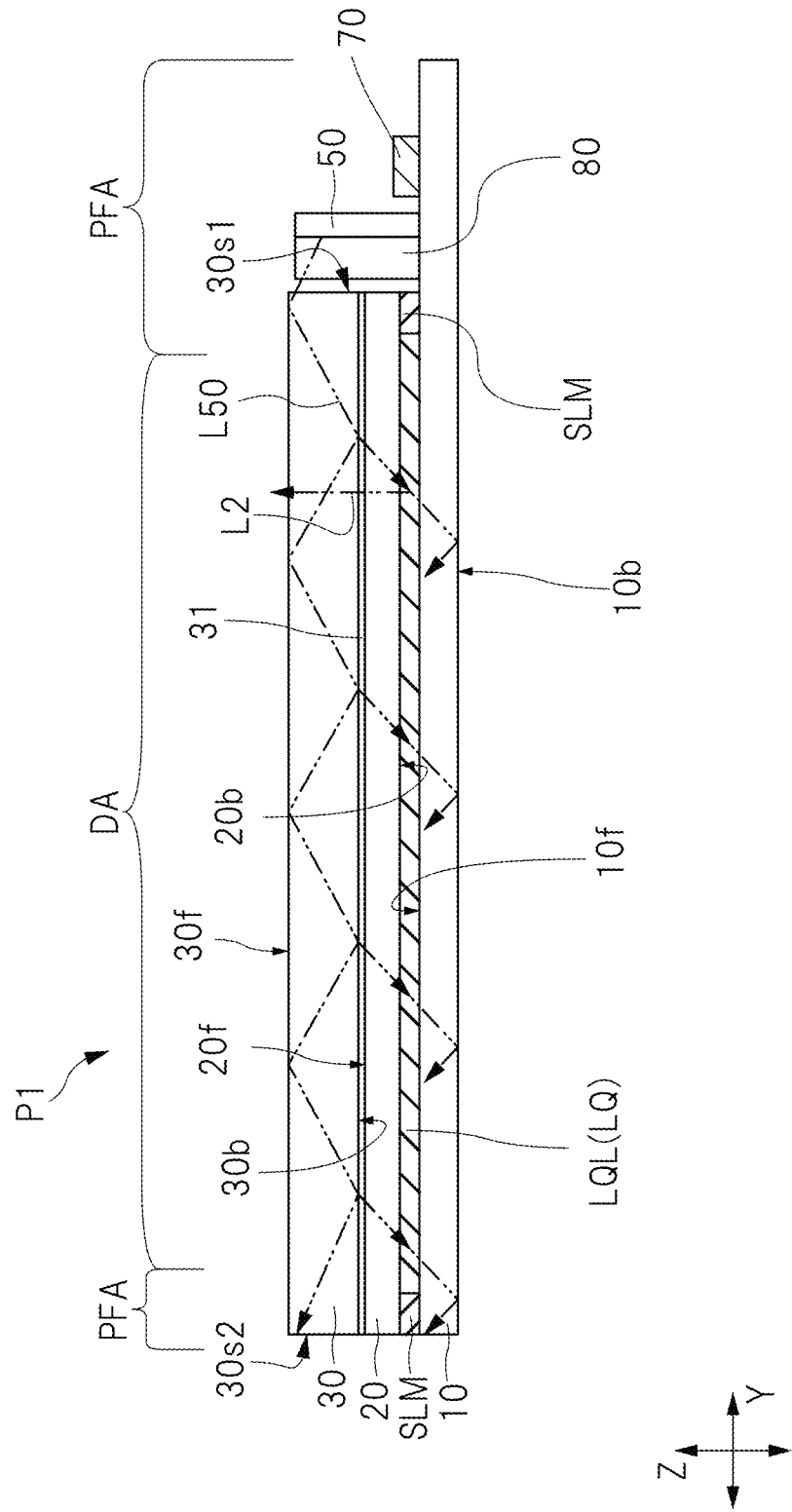
FIG. 5 is a cross-sectional view taken along a line A-A of FIG. 3.
Figure 6:
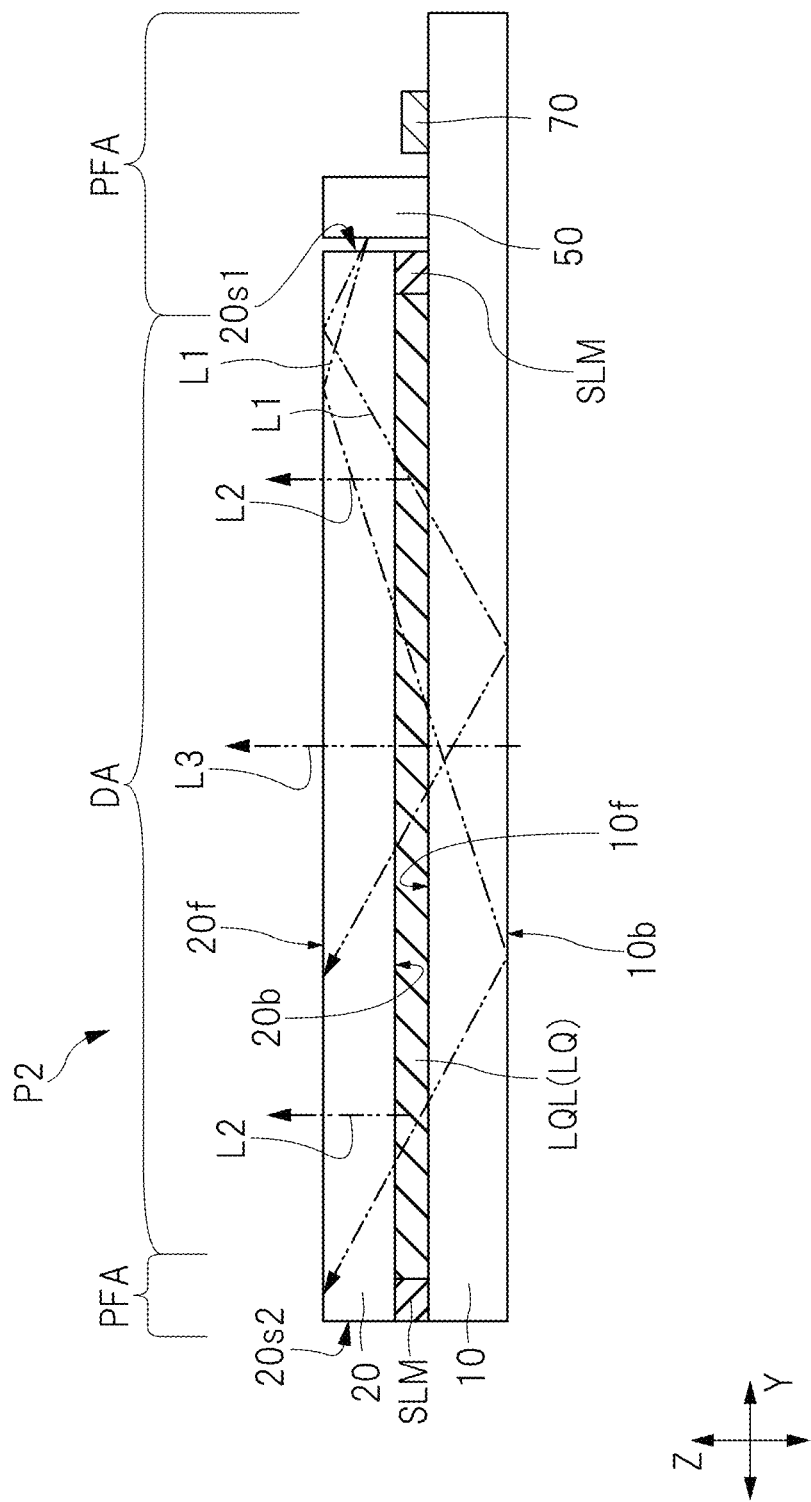
FIG. 6 is an explanatory diagram schematically showing a path of light emitted from a light source unit of a transparent display apparatus according to a study example.

FIG. 3 is a perspective view showing an example of a transparent display panel shown in FIG. 1. In FIG. 3, a boundary between the display region DA and the peripheral region PFA is illustrated with a dashed double-dotted line. And, in FIG. 3, of a circuit included in the display panel P1, some (specifically a gate line GL and a source line SL) of signal wirings transmitting signals for driving the liquid crystal are schematically illustrated with a dashed dotted line. The following drawings including FIG. 3 will be explained so that a direction along a thickness direction of the display panel P1 is a "Z" direction, an extension direction of one side of the display panel P1 on an X-Y plane orthogonal to the Z direction is an "X" direction, and a direction crossing the X direction is a "Y" direction. FIG. 5 is a cross-sectional view taken along a line A-A of FIG. 3. FIG. 6 is an explanatory diagram schematically showing a path of light emitted from a light source unit of a transparent display apparatus according to a study example.

As shown in FIG. 3, the display panel P1 of the present embodiment includes a substrate (array substrate) 10, a substrate (counter substrate) 20, a light guide panel (also referred to as first light guide panel or a first cover glass) 30, a light source unit (first light source unit) 50, a driver circuit 70 and a lens unit 80.

In configuration as the display apparatus, for example, a control circuit, a flexible board connected to the display panel P1, an enclosure or others may be included in addition to each unit of the display panel P1 shown in FIG. 3. In FIG. 3, illustration of other units than the display panel P1 is omitted.

The display panel P1 includes the display region DA where an image is formed in response to an input signal fed from the outside, and a peripheral region (frame region) PFA located around the display region DA. Note that, while the display region DA of the display panel P1 shown in FIG. 3 has a quadrangular shape, the display region may have a shape other than the quadrangular shape, such as a polygonal shape or a circular shape. In plan view in which a display surface is viewed, the display region DA is an effective region where the display panel P1 displays the image. Each of the substrates 10 and 20 and the light guide panel 30 is at a position overlapping the display region DA in plan view. In the example shown in FIG. 1, each of the light source unit 50, the driving circuit 70 and the lens unit 80 is mounted on the substrate 10. However, as a modification example, occasionally, a substrate used for light source but not illustrated is attached to the peripheral region PFA of the substrate 10 separately from the substrate 10, and the light source unit 50 and the lens unit 80 are mounted on the substrate used for light source but not illustrated.

Figure 4:
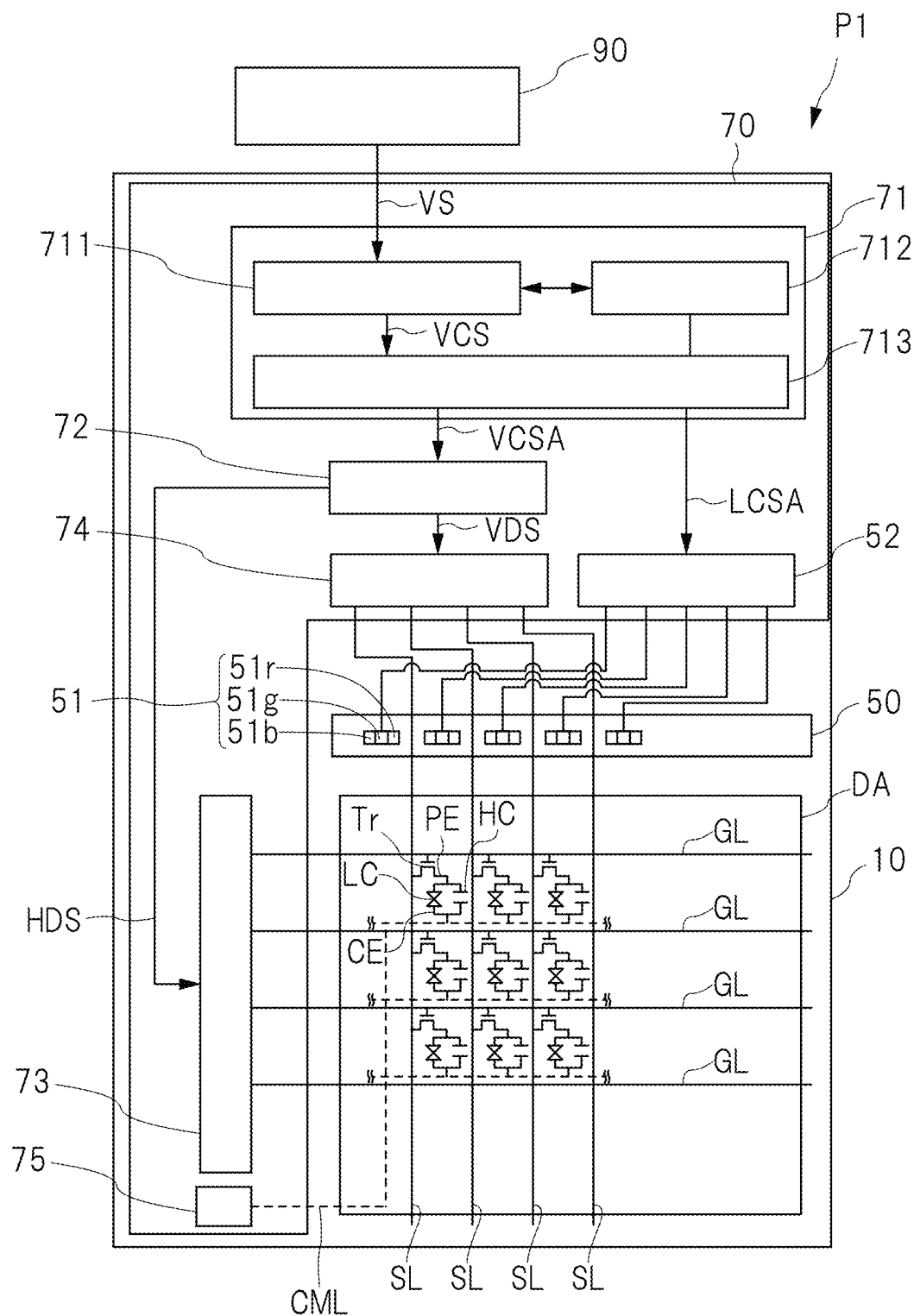
FIG. 4 is a circuit block diagram showing an example of a circuit included in a display panel of FIG. 3.

First, a configuration example of the circuit included in the display panel P1 shown in FIG. 3 will be explained. FIG. 4 is a circuit block diagram illustrating an example of the circuit included in the display panel of FIG. 3. A wiring path connected to a common electrode CE shown in FIG. 4 is formed on, for example, the substrate 20 shown in FIG. 5 described later. In FIG. 4, wirings formed on the substrate 20 are indicated by dotted lines. In the example shown in FIG. 4, a light source control unit 52 is included in the driving circuit 70. As a modification example, the light source unit 50 and the light source control unit 52 may be provided separately from the driving circuit 70. As described above, the substrate used for light source but not illustrated as separated from the substrate 10 may be attached to the peripheral region PFA of the substrate 10 shown in FIG. 3, and the light source unit 50 may be mounted on the substrate used for light source but not illustrated. In this case, the light source control unit 52 is formed in, for example, the substrate used for light source but not illustrated. Alternatively, the light source control unit 52 is formed in an electronic component mounted on the substrate used for light source but not illustrated.

In the example shown in FIG. 4, the driving circuit 70 includes a signal processing circuit 71, a pixel control circuit 72, a gate driving circuit 73, a source driving circuit 74, and a common potential driving circuit 75. The light source unit 50 includes, for example, a light emitting diode 51r, a light emitting diode 51g and a light emitting diode 51b. Note that combination of the light emitting diode 51r, the light emitting diode 51g and the light emitting diode 51b will be described in detail later. Since the substrate 10 has a larger area than the substrate 20 as shown in FIG. 3, the driving circuit 70 is provided on the substrate 10.

The signal processing circuit 71 includes an input signal analyzing unit (input signal analyzing circuit) 711, a storage unit (storage circuit) 712, and a signal adjusting unit 713. The display panel P1 includes a control unit 90 including a control circuit that controls the image display. An input signal VS is input from the control unit 90 to the input signal analyzing unit 711 of the signal processing circuit 71 through a wiring path such as a flexible wiring board not illustrated. The input signal analyzing unit 711 performs an analyzing process on the basis of the input signal VS input thereto from the outside to generate an input signal VCS. The input signal VCS is, for example, a signal that determines, based on the input signal VS, a gradation value given to each pixel PIX (see FIG. 3) of the display panel P1 (see FIG. 3).

The signal adjusting unit 713 generates an input signal VCSA from the input signal VCS input thereto from the input signal analyzing unit 711. The signal adjusting unit 713 transmits the input signal VCSA to the pixel control circuit 72, and transmits a light source control signal LCSA to the light source control unit 52. The light source control signal LCSA is, for example, a signal containing information about light quantity of the light source unit 50 set in accordance with the gradation value input to the pixel PIX.

The pixel control circuit 72 generates a horizontal driving signal HDS and a vertical driving signal VDS on the basis of the input signal VCSA. For example, in the present embodiment, since a field sequential driving method is performed, the horizontal driving signal HDS and the vertical driving signal VDS are generated for each color, light of which can be emitted by the light source unit 50. The gate driving circuit 73 sequentially selects the gate lines GL of the display panel P1 (see FIG. 3) within one vertical scanning period on the basis of the horizontal driving signal HDS. A selection order of the gate lines GL is optional. As shown in FIG. 3, the plurality of gate lines (signal wirings) GL extend in the X direction, and are arrayed in the Y direction.

To each source line SL of the display panel P1 (see FIG. 3), the source driving circuit 74 feeds a gradation signal corresponding to an output gradation value of each pixel PIX (see FIG. 3) within one horizontal scanning period on the basis of the vertical driving signal VDS. As shown in FIG. 3, the plurality of source lines (signal wirings) SL extend in the Y direction, and are arrayed in the X direction. One pixel PIX is formed for each intersection between the gate lines GL and the source lines SL. The switching element Tr (see FIG. 4) is formed at each intersection between the gate lines GL and the source lines SL. The plurality of gate lines GL and source lines SL shown in FIGS. 3 and 4 correspond to the plurality of signal wirings that transmit the driving signals for driving the liquid crystal LQ shown in FIG. 5 (and FIG. 6) described later.

For example, a thin-film transistor is used as the switching element Tr shown in FIG. 4. The type of the thin-film transistor is not limited to any particular type, and, for example, the followings are exemplified: In classification based on a gate position, a bottom-gate transistor and a top-gate transistor are exemplified. Also, in classification based on the number of gates, a single-gate thin-film transistor and a double-gate thin-film transistor are exemplified. One of a source electrode and a drain electrode of the switching element Tr is connected to the source line SL, a gate electrode is connected to the gate line GL, and the other of the source electrode and the drain electrode is connected to one end of a capacitor of the polymer diffused liquid crystal LC (the liquid crystal LQ shown in FIGS. 5 and 6). One end of the capacitor of the polymer diffused liquid crystal LC is connected to the switching element Tr though a pixel electrode PE, and the other end is connected to a common potential wiring CML through the common electrode CE. A holding capacitor HC is generated between the pixel electrode PE and a holding capacitor electrode electrically connected to the common potential wiring CML. Note that the common potential wiring CML is supplied by the common potential driving circuit 75.

Next, a light path of the light emitted from the light source unit 50 in the display panel P1 shown in FIG. 3 will be explained. For simple explanation, the explanation will be made with reference to a display panel P2 having a simplified structure as shown in FIG. 6. Note that the display panel P2 shown in FIG. 6 is the same as the display panel P1 shown in FIG. 5 except that the light guide panel 30 is not included. In the case of the display panel P2, the substrate 20 is used as the light guide panel. Therefore, the following explanation for the display panel P2 is also applicable to the display panel P1 shown in FIG. 5.

As shown in FIG. 6, the display panel P2 includes the substrate 10 and the substrate 20 adhered together to face each other while sandwiching a liquid crystal layer LQL therebetween. The substrate 10 and the substrate 20 are arrayed in the Z direction which is the thickness direction of the display panel P2. In other words, the substrate 10 and the substrate 20 face each other in the thickness direction (Z direction) of the display panel P2. The substrate 10 has a front surface (main surface, surface) 10f facing the liquid crystal layer LQL (and the substrate 20). The substrate 20 has a back surface (main surface, surface) 20b facing the front surface 10f of the substrate 10 (and the liquid crystal layer LQL). The substrate 10 is an array substrate on which a plurality of transistors (transistor elements) serving as switching elements (active elements) Tr (see FIG. 4) are arrayed. The substrate 20 is a substrate provided on the display surface side. The substrate 20 can also be interpreted as an opposing (counter) substrate meaning a substrate facing the array substrate.

The liquid crystal layer LQL containing liquid crystal LQ is located between the front surface 10f of the substrate 10 and the back surface 20b of the substrate 20. The liquid crystal layer LQL is an optical modulation element. The display panel P2 has a function of modulating the light passing therethrough by controlling a state of an electric field formed around the liquid crystal layer LQL via the switching elements described above. The display region DA on the substrate 10 and the substrate 20 overlaps the liquid crystal layer LQL as shown in FIG. 6.

Also, the substrate 10 and the substrate 20 are adhered to each other while sandwiching a seal portion (seal member) SLM therebetween. As shown in FIGS. 3 and 6, the seal portion SLM (see FIG. 6) is disposed in the peripheral region PFA to surround the display region DA. As shown in FIG. 6, the liquid crystal layer LQL is located inside the seal portion SLM. The seal portion SLM plays a role of a seal that seals the liquid crystal between the substrate 10 and the substrate 20. The seal portion SLM also plays a role of an adhesive by which the substrate 10 and the substrate 20 are adhered to each other.

The light source unit 50 is disposed at a position facing a side surface 20s1 of the substrate 20. As schematically illustrated with a dashed double-dotted line in FIG. 6, light-source light L1 emitted from the light source unit 50 propagates in a direction being away from the side surface 20s1 while being reflected by a back surface 10b of the substrate 10 and a front surface 20f of the substrate 20. In a propagation path of the light-source light L1, the back surface 10b of the substrate 10 and the front surface 20f of the substrate 20 are boundaries each between a medium having a large refractive index and a medium having a small refractive index. Thus, when an incident angle of the light-source light L1 incident on the front surface 20f and the back surface 10b is larger than an optimum angle, the light-source light L1 is totally reflected on the front surface 20f and the back surface 10b.

The liquid crystal LQ is polymer diffused liquid crystal LC (see FIG. 4), and contains a liquid crystalline polymer and liquid crystal molecules. The liquid crystalline polymer is formed in stripes, and the liquid crystal molecules are diffused in gaps of the liquid crystalline polymer. Each of the liquid crystalline polymer and the liquid crystal molecule has optical anisotropy or refractive anisotropy. The responsiveness of the liquid crystalline polymer to the electric field is lower than the responsiveness of the liquid crystal molecules to the electric field. The orientation direction of the liquid crystalline polymer hardly changes regardless of the presence or absence of the electric field. On the other hand, when a high voltage equal to or higher than a threshold is applied to the liquid crystal LQ, the orientation direction of the liquid crystal molecules varies depending on the electric field. When the voltage is not applied to the liquid crystal LQ, the optical axes of the liquid crystalline polymer and the liquid crystal molecules are parallel to each other, and the light-source light L1 that has entered the liquid crystal layer LQL is hardly scattered in but transmitted through the liquid crystal layer LQL (transparent state). When the voltage is applied to the liquid crystal LQ, the optical axes of the liquid crystalline polymer and the liquid crystal molecules intersect each other, and the light-source light L1 that has entered the liquid crystal LQ is scattered in the liquid crystal layer LQL (scattered state). In the display panel P2, the transparent state and the scattered state are controlled by controlling the orientation of the liquid crystal LQ in the propagation path of the light-source light L1. In the scattered state, by the liquid crystal LQ, the light-source light L1 is emitted as emitted light L2 from the front surface 20f side to the outside of the display panel P2. Background light L3 that has entered from the back surface 10b side is transmitted through the substrate 10, the liquid crystal layer LQL and the substrate 20, and is emitted from the front surface 20f to the outside. The emitted light L2 and the background light L3 are visually recognized by the observer on the front surface 20f side. The observer can recognize the combination of the emitted light L2 and the background light L3. Such a display panel that enables the observer to recognize the combination of the display image and the background is called a transparent display panel.

The display panel P1 shown in FIG. 5 is different from the display panel P2 shown in FIG. 6 in that the light guide panel 30 is arranged on the substrate 20, in that the lens unit 80 is arranged between the light guide panel 30 and the light source unit 50, and in that the light-source light L50 emitted from the light source unit 50 enters the liquid crystal layer LQL through the lens unit 80 and the light guide panel 30. The display panel (display apparatus) P1 includes the substrate 10 having a front surface 10f and a back surface 10b opposite to the front surface 10f, the substrate 20 having a back surface 20b facing the front surface 10f and a front surface 20f opposite to the back surface 20b, and the liquid crystal layer LQL arranged between the front surface 10f of the substrate 10 and the back surface 20b of the substrate 20. This point is the same as that of the display panel P2 shown in FIG. 6. The display panel P1 further includes the light guide panel 30 adhered and fixed onto the front surface 20f of the substrate 20 so as to sandwich an adhesive layer 31 therebetween, the light source unit 50 having a plurality of light emitting diode elements 51 (see FIG. 4) and arranged on the front surface 10f of the substrate 10 at a position facing a side surface 30s1 of the light guide panel 30, and the lens unit 80 arranged between the light guide panel 30 and the light source unit 50.

The light guide panel 30 has a back surface 30b facing the front surface 20f of the substrate 20 and a front surface 30f opposite to the back surface 30b. Also, the light guide panel 30 has the side surface 30s1 facing the light source unit 50 while sandwiching the lens unit 80 therebetween, and a side surface 30s2 opposite to the side surface 30s1. The light guide panel 30 is adhered and fixed to the substrate 20 while sandwiching the adhesive layer 31 therebetween. At least in the display region DA, a gap between the light guide panel 30 and the substrate 20 is filled with the adhesive layer 31.

In an example shown in FIG. 5, the adhesive layer 31 is adhered to the back surface 30b of the light guide panel 30 as a whole. The light-source light L50 emitted from the light source unit 50 is diffused by the lens unit 80, enters the light guide panel 30 through the side surface 30s1, and travels toward the side surface 30s2 while reflecting.

The adhesive layer 31 is made of a transparent resin material capable of transmitting the visible light. As examples of the adhesive layer 31 allowing the visible light to penetrate therethrough, a transparent bonding sheet that is called Optical Clear Adhesive (OCA) of a sheet shape, an Optical Clear Resin (OCR) used by hardening of a liquid-type transparent adhesive and others are exemplified. Each refractive index of the substrates 10 and 20 and the light guide panel 30 includes various modification examples, but each refractive index is, for example, about 1.5. The refractive index of the adhesive layer 31 is, for example, about 1.37 to 1.5 close to the refractive index of the light guide panel 30.

Under the above-described conditions, a part of the light-source light L50 does not reflect on the boundary with the adhesive layer 31, but enters the substrate 20. The light having entered the substrate 20 travels toward the liquid crystal layer LQL as similar to the light-source light L1 shown in FIG. 6, and enters the liquid crystal layer LQL. The light having scattered in the liquid crystal layer LQL is emitted as the emitted light L2 out of the display panel P1 through the front surface 20f. On the other hand, the light not having scattered in the liquid crystal layer LQL is reflected on the back surface 10b of the substrate 10 and the front surface 20f of the substrate 20 (or the front surface 30f of the light guide panel 30), and propagates in a direction being away from the light-source unit 50.

<Structures of Light Source Unit and Lens>

Figure 7:
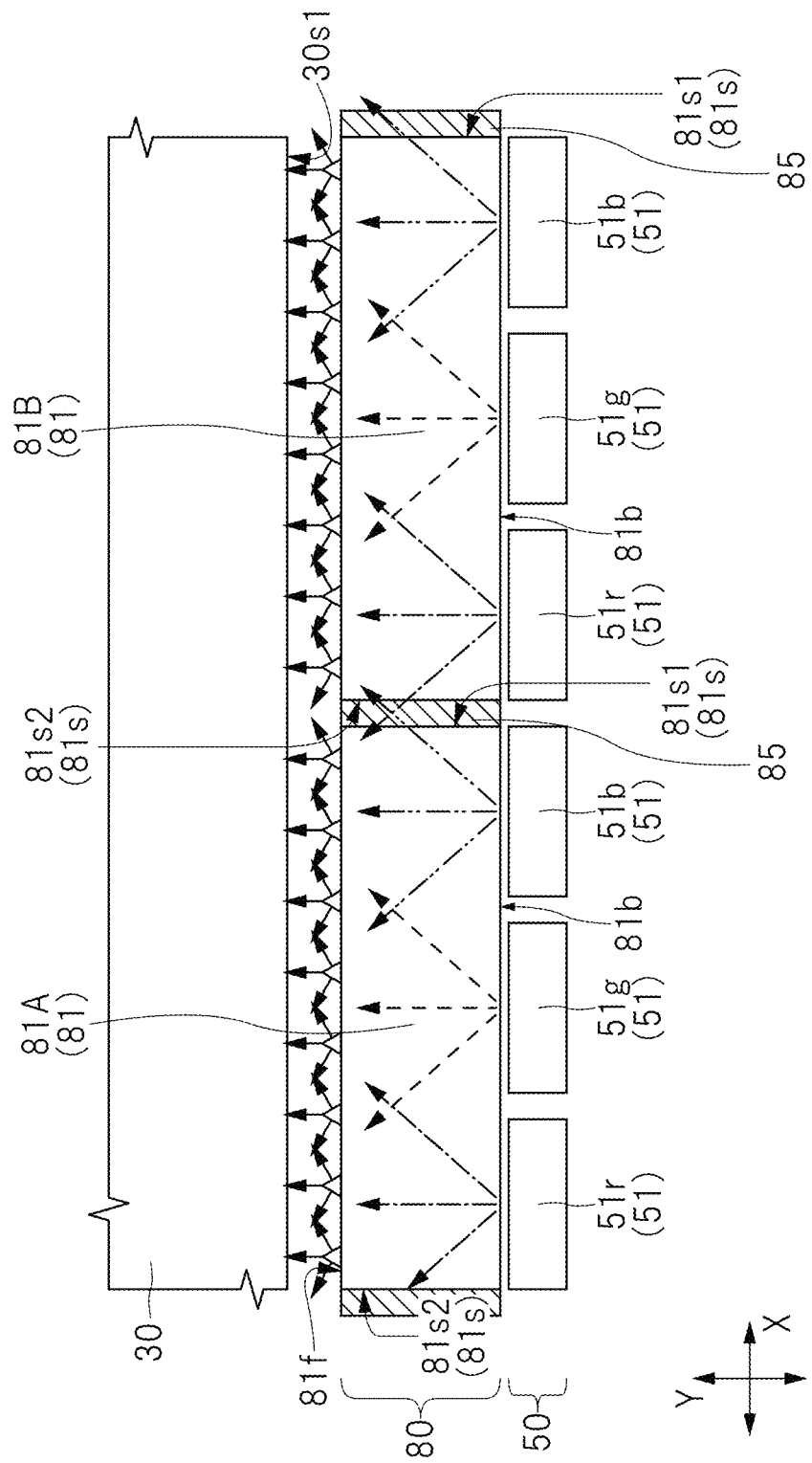
FIG. 7 is a plan view showing a structural example of a light source unit and a lens unit shown in FIG. 3.

Next, structures of the light source unit and the lens will be explained. FIG. 7 is a plan view showing the structures of the light source unit and the lens shown in FIG. 3. The plan shown in FIG. 7 is an X-Y plane including an X direction and a Y direction shown in FIG. 3, and is a plane in which the light guide panel 30, the lens unit 80 and the light source unit 50 are viewed from above. Each of FIGS. 8 and 9 is a plan view showing a study example compared to FIG. 7. The following explanation will be made while taking an example in which the light guide panel 30 is arranged on the front surface side of the substrate 20 separately from the substrate 20 as shown in the display panel P1 in FIG. 5. Note that the following explained technique is also applicable to a usage case of the substrate 20 regarded as a light guide panel without the light guide panel 30 as shown in the display panel P2 in FIG. 6. In this case, the lens unit 80 shown in FIG. 5 is arranged between the light source unit 50 and the substrate 20 shown in FIG. 6. Further, this case is applicable even when the light guide panel 30 explained below is interpreted as the substrate 20.

As shown in FIG. 7, a plurality of lenses 81 are arranged between the light source unit 50 and the light guide panel 30. Each of the plurality of lenses 81 has a surface 81b facing the light source unit 50, a surface 81f opposite to the surface 81b, and a side surface 81s crossing the surface 81b and the surface 81f and having the adhesive layer 85 adhered thereon. The lens is an optical member of the light guide member transmitting the visible light, the optical member having a function of scattering or converging the light by using difference in a refractive index. The lens 81 is one type of the light guide panel. However, in the present embodiment, the lens 81 and the light guide panel 30 arranged in the display region DA (see FIG. 3) will be separately explained.

FIG. 7 is an enlarged plan view illustrating a lens 81A and a lens 81B adjacent to each other among the plurality of lenses 81 in the X direction. As shown in FIG. 7, in the case of the lens unit 80 of the present embodiment, the adhesive layer 85 and the lens 81 are alternately arranged along the X direction. In FIG. 7, the adhesive layer 85 is hatched in order to clearly show existence of the adhesive layer 85 between the adjacent lenses 81. Further, in FIG. 7, in order to distinguish red light, green light, blue light and white light, schematically, the red light emitted from a light emitting diode element 51r is illustrated with an arrow of a dashed dotted line, the green light emitted from a light emitting diode element 51g is illustrated with an arrow of a dotted line, the blue light emitted from a light emitting diode element 51b is illustrated with an arrow of a dashed double-dotted line, and the white light is illustrated with an arrow of a solid line.

In the present embodiment, the lens 81 arranged between the light guide panel 30 and the light source unit 50 has a function of expanding (in other words, scattering) and emitting the light emitted from the light emitting diode element 51 that is a point light source into the light guide panel 30. Further, the lens 81 has a function of mixing the red light, the green light and the blue light and emitting the white light.

Although not illustrated, a method of making the lens unit 80 from non-divided single lens is considered as a study example compared to the present embodiment. This case reduces versatility of the lens since it is necessary to manufacture the lens for each specification (such as size) of the display apparatus. The lens unit 80 is preferably made of the plurality of lenses 81 in a viewpoint of easiness of lens handling. Also, when the versatility of the lens is improved, a small lens 81 can be massively produced, and therefore, a production efficiency of the lenses 81 can be improved. When the lens unit 80 is collection of the plurality of lenses 81, the merits as described above are provided.

However, from the studies made by the inventors of the present application, it has been found out that the method of simply making the lens unit 80 from the collection of the plurality of lenses 81 has an optical problem. In the study example shown in FIG. 8 and the study example shown in FIG. 9, the plurality of lenses 81 separate from each other while sandwiching an air layer therebetween. Also, in the study example shown in FIG. 9, surface roughness of the side surface 81s is larger than surface roughness of the side surface 81s shown in FIG. 8.

When the plurality of lenses 81 separate from each other while sandwiching the air layer therebetween as shown in the study example shown in FIG. 8, the light having reached the side surface 81s is occasionally reflected on the side surface 81s. In this case, the mixture of the light colors does not occur around the air layer, color unevenness occurs as a whole, and it is difficult to emit the white light.

Meanwhile, when the plurality of lenses 81 separate from each other while sandwiching the air layer therebetween while the surface of the side surface 81s has the large surface roughness because of having the micro surface asperity as shown in the study example shown in FIG. 9, the light having reached the side surface 81s is scattered by the micro surface asperity of the side surface 81s. This case occasionally causes the failure in the mixed color around the air layer, and besides, causes the air layer to undesirably shine.

Accordingly, the inventors of the present application have studied a technique of suppressing occurrence of the optical problem while providing the merit that is the separation of the lens 81 into the plurality of pieces. As shown in FIG. 7, in the present embodiment, the adhesive layer 85 is arranged between the facing side surfaces 81s of the lens 81. The adhesive layer 85 is made of the resin material allowing the visible light penetrate therethrough. The refractive index of the adhesive layer 85 is adjusted to be close to the refractive index of the lens 81.

When the adhesive layer 85 allowing the visible light to penetrate therethrough interposes between the facing side surfaces 81s, the light having reached the side surface 81s is more difficult to be reflected and scattered on the side surface 81s than those of the study examples shown in FIGS. 8 and 9. In the example shown in FIG. 7, for example, the light having been emitted from the light emitting diode element 51b and reached the side surface 81s1 of the lens 81A penetrates through the adhesive layer 85, and enters the adjacent lens 81B through the side surface 81s of the lens 81B. On the other hand, the light having been emitted from the light emitting diode element 51r and reached the side surface 81s2 of the lens 81B penetrates through the adhesive layer 85, and enters the adjacent lens 81A through the side surface 81s1 of the lens 81A. Therefore, even around the adhesive layer 85, the light colors are mixed, and the white light having the less color unevenness as a whole is emitted from the lens 81.

As shown in FIG. 7, in order to suppress the light reflection on the boundary between the adhesive layer 85 and the lens 81, the refractive index of the adhesive layer 85 is preferably close to the refractive index of the lens 81. For example, in the present embodiment, difference between the refractive index (for example, about 1.37 to 1.5) of the adhesive layer 85 and the refractive index of the lens 81 is smaller than difference between the refractive index of the adhesive layer 85 and the refractive index (1) of the air.

The arrangement of the adhesive layer 85 is sufficient at least at the position which the light having been emitted from the light emitting diode element 51 reaches. Therefore, as a modification example not illustrated, only a part of the side surface 81s is occasionally covered with the adhesive layer 85. However, in order to reliably prevent the light reflection, the adhesive layer 85 is preferably adhered to cover the entire side surface 81s of the lens 81 as shown in FIG. 7. In this case, the light of the plurality of colors can be reliably mixed around the adhesive layer 85.

In the present embodiment, the light emitting diodes 51 that emit the light having the different colors from one another are arranged near the adhesive layer 85. For example, when the light emitting diode elements 51 are arranged in an order of red, green and blue as shown in FIG. 7, the light emitting diode elements 51 emitting the different colors are necessarily adjacent to one another. Since the light emitting diode elements 51 emitting the different colors are arranged to be adjacent to one another as described above, the light having the different colors can be easily mixed. Such a configuration can be mentioned as follows. The plurality of lenses 81 include the lens 81A having the side surface (lens side surface) 81s1 and the lens 81B having the side surface (lens side surface) 81s2 facing the side surface (lens side surface) 81s1 while sandwiching the adhesive layer 85 therebetween. The plurality of light emitting diode elements 51 include the light emitting diode element 51b capable of emitting first-color (such as blue) light and the light emitting diode element 51r capable of emitting second-color (such as red) light different from the first color. The light emitting diode element 51b is arranged at a position facing the surface 81b of the lens 81A and being the closest to the side surface 81s1 of the lens 81A. The light emitting diode element 51r is arranged at a position facing the surface 81b of the lens 81B and being the closest to the side surface 81s2 of the lens 81B.

Note that FIG. 7 shows the example of the arrangement in the order of red, green and blue. However, the arrangement of the light emitting diode elements 51 is not limited to the aspect shown in FIG. 7, and includes various modification examples. The example shown in FIG. 7 is an example in which the light emitting diode elements 51r, 51g and 51b are arranged at the position facing the surface 81b of one lens. However, the number of the light emitting diode elements 51 facing the one lens 81 is not limited to three. Note that a package including the light emitting diode elements 51r, 51g and 51b, the number of each of which is one, arranged and sealed therein is occasionally used. In this case, the aspect shown in FIG. 7 is preferable in order to equalize a size of the lens 81 and sizes of the packaged three light emitting diode elements 51.

As another modification example, all the plurality of light emitting diode elements 51 are occasionally made of the white-color light emitting diode elements 51. Alternatively, although the numbers of the light emitting diode elements 51 for the red color, the green color and the blue color are, for example, the same as one another in the example shown in FIG. 7, the number of the light emitting diode elements 51 for certain color such as the red color, the green color and the blue color is occasionally larger than the number of the light emitting diode elements 51 for another color as another modification example. In other words, the total number of the plurality of light emitting diode elements 51r, the total number of the plurality of light emitting diode elements 51g and the total number of the plurality of light emitting diode elements 51b are occasionally different from one another. Further, as another modification example compared to FIG. 7, the side surface 81s of the lens 81A and the adhesive layer 85 are occasionally arranged between the light emitting diode elements 51 for the same color.

Next, a modification example compared to FIG. 7 will be explained with reference to FIG. 10. FIG. 10 is a plan view showing a structure example of the lens unit according to the modification example compared to FIG. 7. The lens 81 shown in FIG. 10 is different from the lens 81 shown in FIG. 7 in that the surface roughness of the side surface 81s is larger than the surface roughness of the front surface 30f shown in FIG. 5. Other points are the same as those of the lens 81 shown in FIG. 7.

When the small lens 81 is manufactured, there is a considered method of providing the small lens 81 by forming the lens surface 81b and the surface 81f first from a large-area lens, and then, cutting the large-area lens. In this case, the lens surface 81b and the surface 81f can be machined before the cutting, and therefore, the high production efficiency can be expected. In the cutting step for providing the small lens, methods such as blade dicing and laser dicing are exemplified.

The side surface 81s shown in FIG. 10 is formed by the above-described cutting step. Regarding the surface roughness of the cut surface, there is a method of forming a flat surface as shown in FIG. 7 by a planarization process such as polishing on the side surface 81s. However, work for planarizing all cut surfaces is necessary, and this becomes a cause of reduction in the production efficiency. Meanwhile, it is necessary to planarize the front surface 30f of the light guide panel 30 shown in FIG. 5 in order to prevent the light from being reflected or scattered in an undesirable direction. Also, as similar to the side surface 30s3 as shown in FIG. 3, the planarization process is preferably performed to the side surface 30s3 (see FIG. 3) crossing the side surfaces 30s1 and 30s2 as shown in FIG. 5 in order to suppress the light-source light L50 from emitting outward through the side surface 30s2. Therefore, if the planarization process is not performed to the side surface 81s, the surface roughness of the side surface 81s shown in FIG. 10 is larger than the surface roughness of the front surface 30f shown in FIG. 5. Similarly, the surface roughness of the side surface 81s shown in FIG. 10 is larger than the surface roughness of the side surface 30s3 shown in FIG. 3.

The planarization process onto the lens 81 is occasionally performed to the surface (back surface, main surface) 81b (see FIGS. 7 to 10) of the lens 81 (see FIGS. 7 to 10) facing the front surface 10f (see FIG. 5) of the substrate 10 (see FIG. 5) and to the surface (front surface, main surface) 81f opposite to the surface 81b in the Z direction. In this case, the surface roughness of the side surface 81s of the planarized lens 81 is larger than those of the surfaces 81b and 81f of the lens 81.

When the air layer is arranged between the facing side surfaces 81s as shown in FIG. 9, there is a possibility of light scattering due to the surface asperity of the side surface 81s. On the other hand, when the adhesive layer 85 is arranged between the facing side surfaces 81s as shown in FIG. 10, difference between the refractive index of the lens 81 configuring the micro asperity surface and the refractive index of the adhesive layer 85 is small. Therefore, as shown in FIG. 10, the light scattering on the boundary between the side surface 81s and the adhesive layer 85 can be suppressed. As a result, as similar to the example shown in FIG. 7, the light of the plurality of colors can be reliably mixed around the adhesive layer 85. In the present modification example, the phenomena of the undesirable light generation on the side surface 81s can be suppressed in comparison with the study example shown in FIG. 9. Further, in the present modification example, the lens 81 can be used in the state of the large surface roughness of the side surface 81s, and therefore, the production efficiency can be improved in comparison with the case of the planarized side surface 81s.

The embodiment and the typical modification examples have been explained above. However, the above-described techniques are applicable to various modification examples other than the exemplified modification examples. For example, the above-described modification examples may be combined.

Various modification examples and alteration examples could have been easily anticipated within the scope of the concept of the present invention, by those who are skilled in the art, and it would be understood that these various modification examples and alteration examples belong to the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the idea of the present invention.

The present invention is applicable to a display apparatus and an electronic device embedded in the display apparatus.

What is claimed is:
1. A display apparatus comprising:
  a first substrate including a first front surface and a first back surface opposite to the first front surface;
  a liquid crystal layer arranged on the first front surface of the first substrate;

a light guide panel including a first surface facing the first front surface, a second surface opposite to the first surface and a first side surface crossing the first surface and the second surface;

a light source unit including a plurality of light emitting diodes arranged in a first direction at a position facing the first side surface of the light guide panel; and a plurality of lenses arranged in the first direction between the light guide panel and the light source unit and adhered to each other while sandwiching an adhesive layer allowing visible light to penetrate therethrough, wherein each of the plurality of lenses includes a third surface facing the light source unit, a fourth surface opposite to the third surface, and a lens side surface crossing the third surface and the fourth surface and adhered to the adhesive layer, and the adhesive layer is arranged between the lens side surfaces facing each other.

2. The display apparatus according to claim 1,
wherein difference between a refractive index of the adhesive layer and a refractive index of the lens is smaller than difference between the refractive index of the adhesive layer and a refractive index of air.

3. The display apparatus according to claim 2,
wherein surface roughness of the lens side surface is larger than surface roughness of the second surface of the light guide panel.

4. The display apparatus according to claim 1,
wherein the adhesive layer is adhered to cover the entire lens side surface of the lens.

5. The display apparatus according to claim 1,
wherein the plurality of lenses include a first lens having a first lens side surface and a second lens having a second lens side surface facing the first lens side surface while sandwiching the adhesive layer therebetween, the plurality of light emitting diode elements include a first light emitting diode element capable of emitting first-color light and a second light emitting diode element capable of emitting second-color light different from the first color, the first light emitting diode element of the plurality of light emitting diode elements is arranged at a position facing the third surface of the first lens and being the closest to the first lens side surface, and the second light emitting diode element of the plurality of light emitting diode elements is arranged at a position facing the third surface of the second lens and being the closest to the second lens side surface.

* * * * *